United States Patent
Lerman (10) Patent No.: US 6,839,866 B2
(45) Date of Patent: Jan. 4, 2005

(54) SYSTEM AND METHOD FOR THE USE OF RESET LOGIC IN HIGH AVAILABILITY SYSTEMS

(75) Inventor: Kenneth Lerman, Newtown, CT (US)

(73) Assignee: Sycamore Networks, Inc., Chelmsford, MA (US)

(*) Notice: Subject to any disclaimer, the term of this patent is extended or adjusted under 35 U.S.C. 154(b) by 387 days.

(21) Appl. No.: 09/872,263

(22) Filed: May 31, 2001

(65) Prior Publication Data

US 2002/0194531 A1 Dec. 19, 2002

(Under 37 CFR 1.47)

(51) Int. Cl.[7] .................................................. G06F 11/00
(52) U.S. Cl. ............................... 714/13; 714/10; 712/31
(58) Field of Search ................................ 714/10, 51, 1, 714/11, 23, 13, 2, 12, 31; 712/31, 15; 713/2

(56) References Cited

U.S. PATENT DOCUMENTS

| | | | | |
|---|---|---|---|---|
| 4,894,828 A | * | 1/1990 | Novy et al. ................... 714/11 |
| 5,155,729 A | * | 10/1992 | Rysko et al. .................. 714/11 |
| 5,202,822 A | * | 4/1993 | McLaughlin et al. ......... 700/82 |
| 5,285,381 A | * | 2/1994 | Iskarous et al. .............. 700/82 |
| 5,898,829 A | * | 4/1999 | Morikawa .................... 714/47 |
| 5,919,266 A | * | 7/1999 | Sud et al. ..................... 714/13 |
| 5,953,314 A | * | 9/1999 | Ganmukhi et al. ......... 370/220 |
| 6,141,770 A | * | 10/2000 | Fuchs et al. .................. 714/11 |
| 6,263,452 B1 | * | 7/2001 | Jewett et al. .................. 714/9 |
| 6,321,344 B1 | * | 11/2001 | Fenchel ......................... 714/4 |
| 6,327,675 B1 | * | 12/2001 | Burdett et al. ................ 714/11 |
| 6,408,399 B1 | * | 6/2002 | Baughman ..................... 714/4 |
| 6,460,146 B1 | * | 10/2002 | Moberg et al. ............... 714/10 |
| 6,502,206 B1 | * | 12/2002 | Kosuge et al. ................ 714/13 |
| 6,557,099 B1 | * | 4/2003 | Takeda .......................... 713/2 |
| 6,654,648 B2 | * | 11/2003 | Nada et al. ................... 700/19 |
| 6,694,450 B1 | * | 2/2004 | Kidder et al. ................. 714/15 |
| 2002/0099972 A1 | * | 7/2002 | Walsh et al. .................. 714/10 |
| 2002/0141429 A1 | * | 10/2002 | Pegrum et al. .............. 370/422 |
| 2003/0115500 A1 | * | 6/2003 | Akrout et al. ................ 714/10 |

* cited by examiner

Primary Examiner—Robert Beausoliel
Assistant Examiner—Christopher S. McCarthy
(74) Attorney, Agent, or Firm—Lahive & Cockfield, LLP (57) ABSTRACT

A method of providing reset logic in high availability computer systems is disclosed. The illustrative embodiment of the present invention uses probability theory in combination with redundant processors and components to ensure system availability. Detected errors are verified, and malfunctioning processors or components are then changed to a reset state that functionally removes them from the system. Detected errors which can not be verified result in the processor or component that incorrectly detected the error being placed in a reset state. The use of redundant components and processors enable standby processors to be activated to take the place of reset processors quickly enough to maintain system availability.

25 Claims, 4 Drawing Sheets

SYSTEM AND METHOD FOR THE USE OF RESET LOGIC IN HIGH AVAILABILITY SYSTEMS

FIELD OF THE INVENTION

The illustrative embodiment of the present invention relates generally to high availability systems and more particularly to the use of reset logic in high availability systems.

BACKGROUND OF THE INVENTION

The term "high availability system" is used in the telecommunications industry to specify a system meeting an availability requirement of 99.999%. Frequently, the system availability requirement is met through the use of multiple redundant components which may include multiple processors. Typically, processors possess three activation states; active, standby and reset. A processor in an active state is fully functioning and processing all of its assigned operations. A processor in a standby state is usually a redundant processor which is available to replicate the activities of an active processor if needed. A processor in a standby state performs only a small percentage of the operations of which it is capable. For example, both an active processor and a standby processor may receive the same information from a system component, but ordinarily only the active processor will act on the information while the standby processor merely monitors the information. However, there are exceptions to the general rule that only the active processor acts on received information. A processor in a reset state is frozen such that it is treated as functionally removed from the system by the other system components. In the event that one of the processors in the system fails, the failure of the processor must be detected and the processor put in a reset state so that it can cause no other failures in the system.

A number of techniques have been devised to detect and reset failed processors in a high availability system. In one technique, a hardware watchdog timer periodically verifies that a processor is capable of performing a defined task in a pre-determined amount of time. If the watchdog timer determines that a processor has failed to perform the defined task in the predetermined amount of time, the timer generates a reset signal to the processor. This technique is deficient for a couple of different reasons. The defined task is usually a very simple task that is not indicative of the requirements for the processor, such as performing a simple math operation in a given amount of time. Also, the watchdog timer is built into the hardware which limits its adaptability for different tests. A second technique that has been used in high availability systems is the use of a second processor to determine whether a first processor has failed. In the event the second processor determines the first processor has failed, the second processor generates a reset signal to the first processor. The problem associated with this technique is that it raises the question of who is watching the watcher. In other words, if the second processor fails rather than the first processor, the second processor's failure may be undetected and the first processor may be reset erroneously.

SUMMARY OF THE INVENTION

The illustrative embodiment of the present invention provides a reliable means of detecting the failure of a processor in a high availability system, and a method of resetting the failed processor. The term high availability system, as used herein, refers to a system which is immune to the failure of any single active component. Through the use of probability theory and multiple redundant components, the illustrative embodiment of the present invention provides a means for detecting, verifying and resetting a failed processor while meeting the system availablity requirements of a high availability system.

In one embodiment of the present invention, a computer system, such as a high availability computer system, includes an active system control processor with a plurality of activation states. The high availability computer system also includes a standby system control processor with a plurality of activation states as well as a plurality of system components. The system control processors control a plurality of other processors, each with their own activation state, in the system. When an error is detected by the active system control processor and verified by the standby system control processor, both the active and standby system control processors send a reset signal to the other processor with the error. The activation state for the other processor is changed to a reset activation state, an action that functionally removes it from the system.

In another embodiment of the present invention, a computer system, such as a high availability computer system, includes both an active and standby system control processor with a plurality of activation states. The high availability computer system also includes a plurality of other processors and components, including a system component with a reset function capable of changing the activation state of an system control processor. When an error in one of the other processors is detected by the active system control processor, the standby system control processor attempts to verify the error. If the detected error is not verified by the standby system control processor the other processor is not reset. Based on probability theory, the active system control processor is treated as having erroneously detected the initial error. Accordingly, instead of resetting the other processor, the active system control processor is reset. The standby system control processor and the system component with a reset function jointly send a reset signal to the active system control processor which changes its activation state from an active state to a reset state.

In an alternate embodiment of the present invention, a computer system, such as a high availability computer system, includes an active and a standby system control processor, both with a plurality of activation states, and a plurality of other processors. Additionally, the system includes a system component with a reset function capable of changing the activation state of a system control processor. When an error is detected in the active system control processor by the standby system control processor, the system component with the reset function is notified and attempts to verify the error in the active system control processor. If the error in the active system control processor is verified, the system component with the reset function and the standby system control processor jointly send a reset signal to the active system control processor which changes its activation state from an active state to a reset state.

In another embodiment of the present invention, a computer system, such as a high availability computer system, includes an active and a standby system control processor, both with a plurality of activation states, and a plurality of other processors. Additionally, the system includes a system component with a reset function capable of changing the activation state of a system control processor. When an error is detected in the active system control processor by the standby system control processor, the system component with the reset function is notified and attempts to verify the error in the active system control processor. If the error in the active system control processor is not verified, the active system control processor is not reset. Based on probability theory, the standby system control processor is treated as having erroneously detected the initial error. Accordingly, instead of resetting the active system control processor, the standby system control processor is reset. The active system control processor and the system component with a reset function jointly send a reset signal to the standby system control processor which changes its activation state from an active state to a reset state.

DETAILED DESCRIPTION

The illustrative embodiments of the present invention provide a mechanism to accurately and quickly detect processor and component failure, including placing a failed processor into a reset activation state where it is functionally removed from the system. Many systems are required to perform continuously even in the event of component failure. High availability systems, such as those utilized in the telecommunications industry, typically must recover from failures in system components within 50 milliseconds or less. As noted above, this is often achieved using multiple redundant components including multiple processors. Having the available hardware to recover from system failure is only one part of the failure recovery process, however. It is also necessary to accurately detect processor and component failures and switch to the backup redundant processor and/or components in a timely manner. The illustrated embodiments of the present invention enable the diagnosis and recovery from processor problems in the system with minimal service disruptions.

Figure 1:
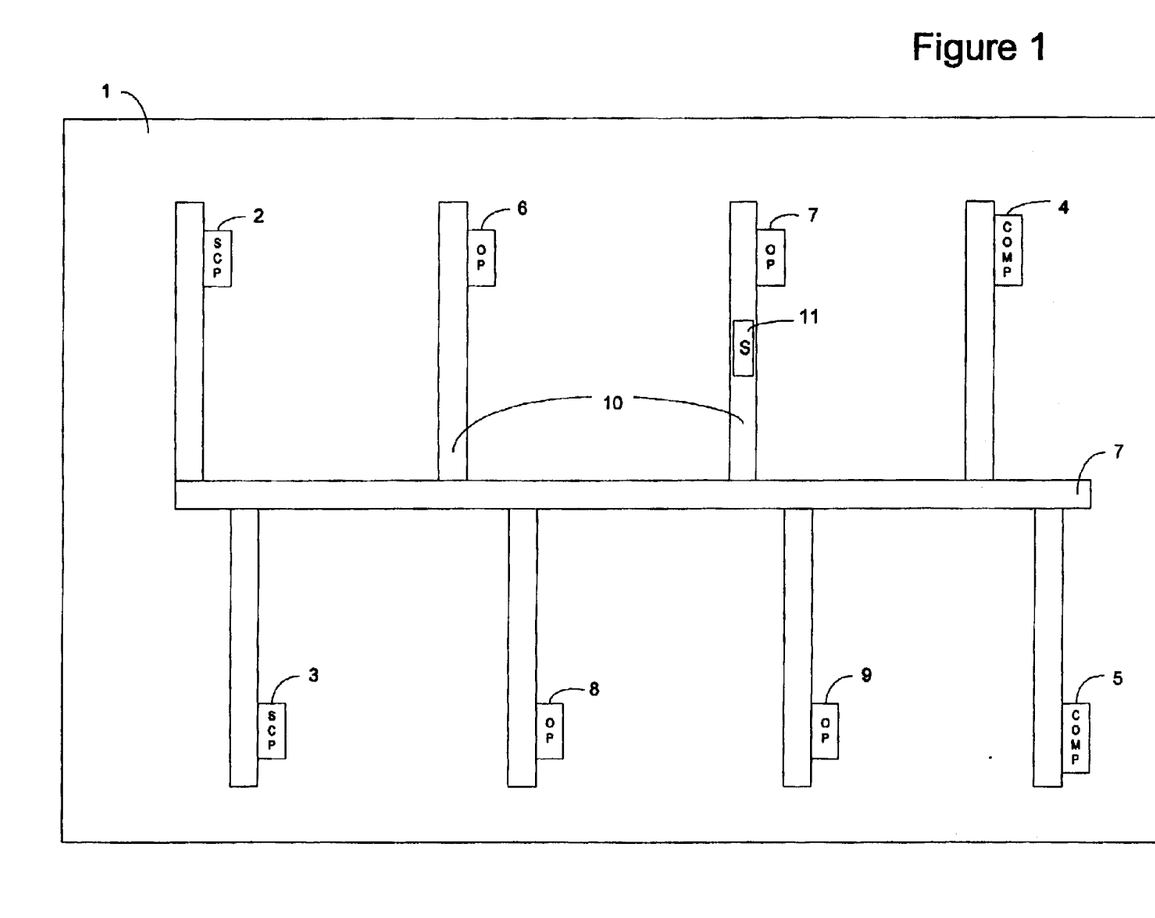
FIG. 1 is a block diagram depicting a high availability computer system environment suitable for practicing an embodiment of the present invention.

FIG. 1 depicts a block diagram of a high availability computer system suitable for practicing an illustrative embodiment of the present invention. The high availability computer system 1 maybe a networking switch, such as the SN4000 from Sycamore Networks of Chelmsford, Mass. The high availability computer system includes a system control processor (SCP) in an active activation state (active system control processor) 2 and a system control processor in a standby activation state (standby system control processor) 3. The high availability computer system 1 also includes a system component 4 with a reset function in an active activation state and may include a system component with a reset function in a standby state 5. Also included in the high availability computer system 1 are a plurality of other processors (OPs) 6, 7, 8, and 9, which are subject to the commands of the active system control processor. The system control processors, other processors, and system components with reset functions may appear on I/O cards 10 interconnected by way of a connection media 7. The connection media 7 may be a mid-plane or backplane in a networking switch. Also located on the I/O cards 10 may be software 11 which performs self diagnostic tests which check the status of the 10 card and its processor 7.

Figure 2:
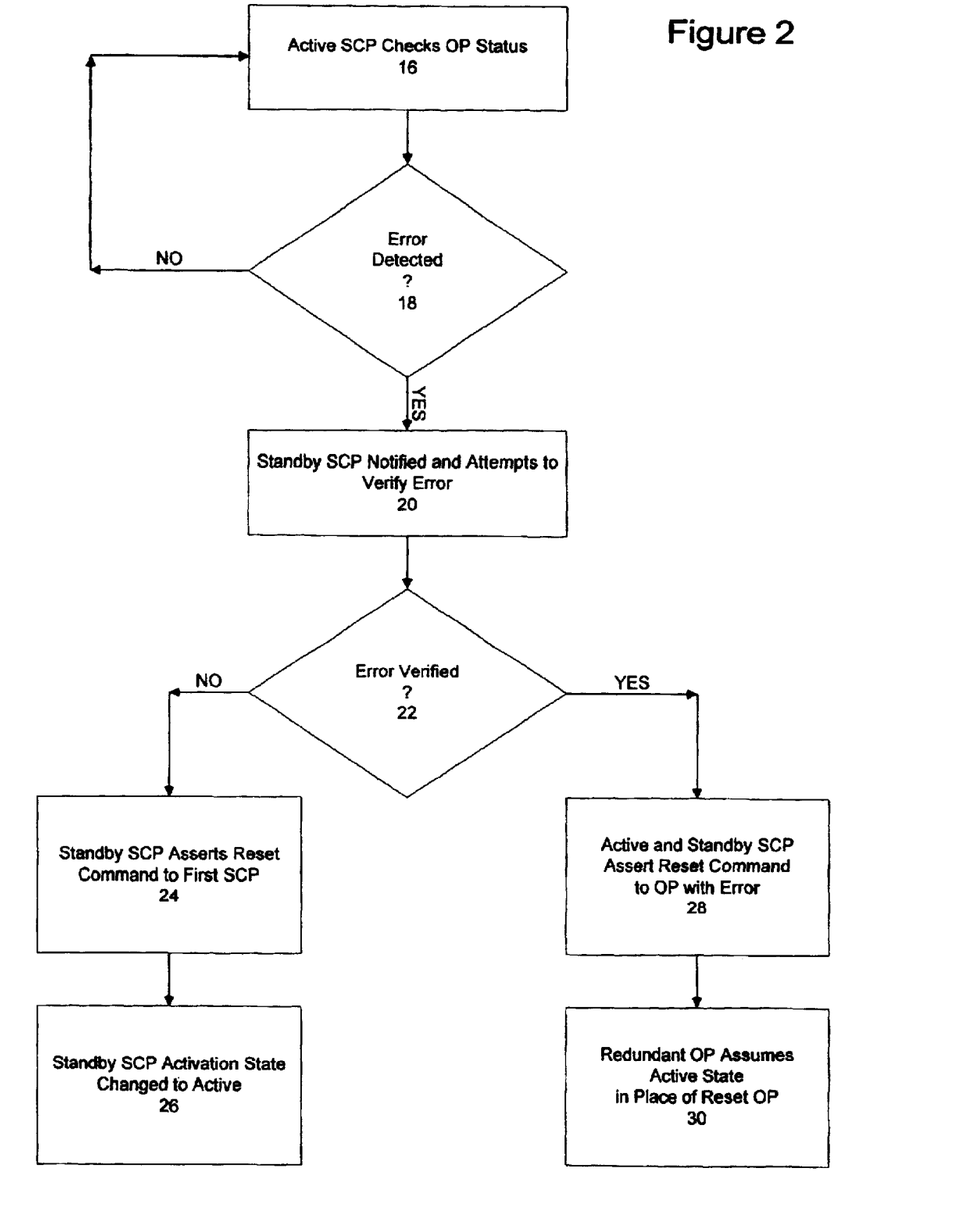
FIG. 2 is a flow chart of the sequence of steps executed by an illustrative embodiment of the present invention resetting another processor in the system following detection of an error in the other processor by the active system control processor.

FIG. 2 is a flow chart of the sequence of steps followed by an illustrative embodiment of the present invention following the active system control processor 2 detecting an error in another processor 6, 7, 8 and 9. The active system control processor 2, periodically checks the operating status of the other processors 6, 7, 8, and 9 present in the high availability computer system 1 (step 16). For example, the active system control processor 2 may periodically check status at a set time. Alternatively, the active system control processor 2 may check status during periods of peak processor usage or periods of low processor usage. The active system control processor 2 may "ping" the other processors 6, 7, 8, and 9 to detect their working status (eg.: send a message requiring a response), or may perform some other more substantive tests to determine errors in the other processors (step 18). The period of time in which the active system control processor 2 is querying the other processors 6, 7, 8, and 9 to determine their working status is very small, on the order of milliseconds. If no error is detected in the other processors 6, 7, 8, and 9, the active system control processor 2 waits a pre-determined amount of time and then checks with the other processors again in a continuous cycle (step 16). If the active system control processor 2 detects an error in one of the other processors 6, 7, 8, and 9, the standby system control processor 3 is notified and attempts to verify the error in the identified other processor (step 20). The standby system control processor 3 first makes a determination as to whether or not the identified other processor 6, 7, 8, and 9 is malfunctioning (step 22). If the standby system control processor 3 determines that the identified other processor 6, 7, 8, and 9 is not malfunctioning, the standby system control processor asserts a reset command to the active system control processor 2 (step 24).

The decision to assert a reset command to the active system control processor 2 rather than the identified other processor 6, 7, 8, and 9 is based on probability theory. The probability theory is based on the fact that the period of time between the active system control processor 2 detecting an error and the standby system control processor 3 querying the other processors 6, 7,8, and 9 to verify the error is very small, on the order of milliseconds. If the active system control processor identifies an error in one of the other processors and the standby system control processor 3 does not detect the same error, one of two scenarios is possible. Either the active system control processor 2 is correct and, thus, both the identified other processor 6, 7, 8, and 9 and the standby system control processor 3 are malfunctioning, or the active system control processor 2 erroneously detected the error. Since the probability of two processors failing within the same small time period is extremely remote, the active system control processor 2 is deemed to have failed and the standby system control processor 3 sends a reset signal to the active system control processor to change its activation state to a reset activation state (step 24). Once the active system control processor 2 assumes a reset activation state, the active system control processor is functionally removed from the system and can cause no further damage to the working conditions of the system. Following asserting the reset command to the active system control processor 2, the activation state of the standby system control processor 3 is changed from standby to active and the standby system control processor becomes the active system control processor (step 26). If the high availability computer system 1 includes a third system control processor, the third system control processor replaces the original standby control processor 3 as the standby system control processor.

If the standby system control processor 3 verifies the error in the other processor 6, 7, 8, and 9 that was originally identified by the active system control processor 2, the active and standby system control processors 2 and 3 jointly assert a reset command to the identified other processor (step 28). The identified other processor 6, 7, 8, and 9 transitions from an active activation state to a reset activation state, an activation state which functionally removes the identified processor from the system. A redundant processor that duplicates the functions of the reset processor is switched to an active state to replace the reset processor. (step 30).

Figure 3:
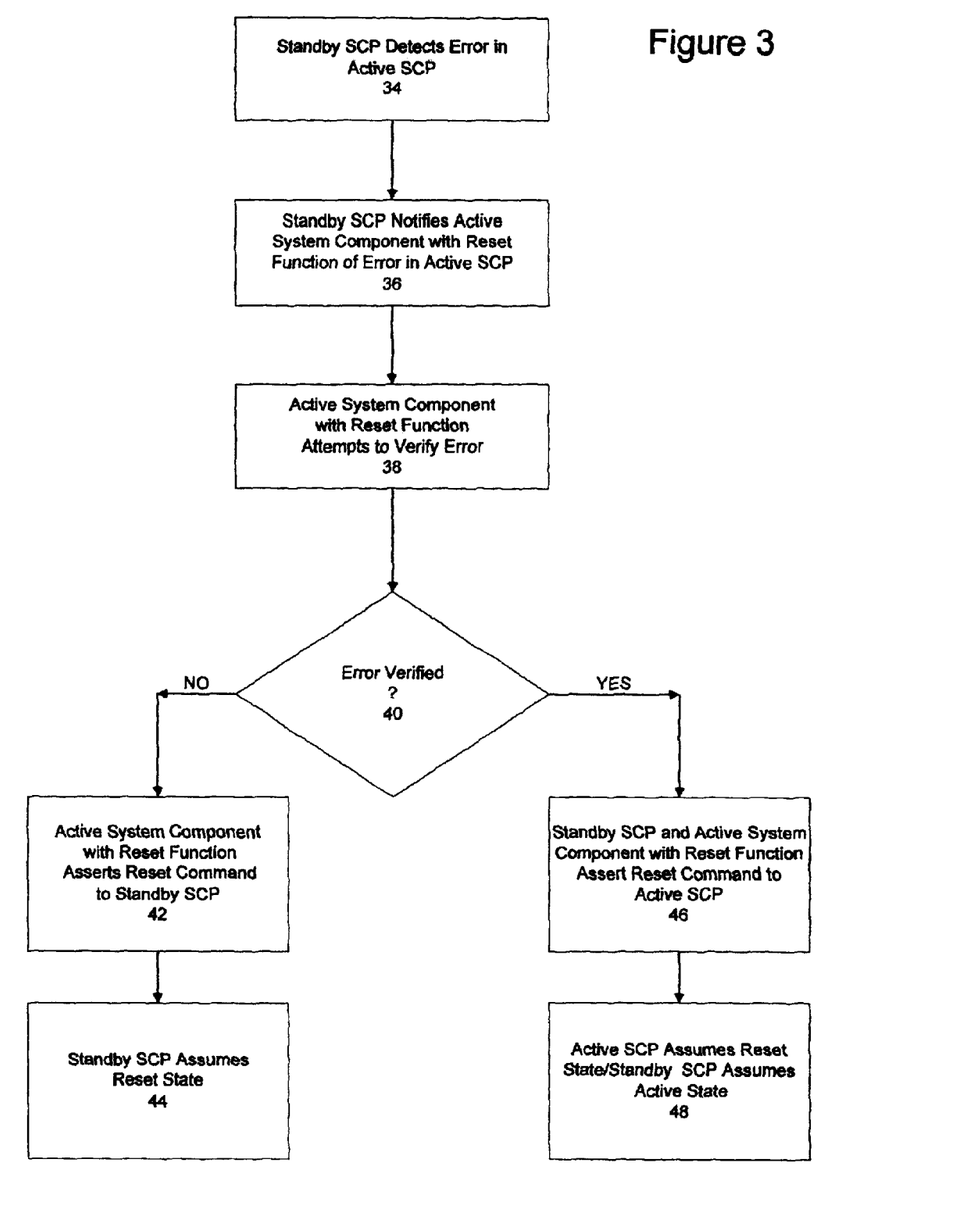
FIG. 3 is a flow chart of the sequence of steps executed in an embodiment of the present invention when the standby system control processor detects an error in the active system control processor.

FIG. 3 is a flow chart of the sequence of steps followed by an illustrative embodiment of the present invention when a standby system control processor 3 performing routine checks on the working status of the active system control processor 2 detects an error in the active system control processor. The sequence of steps begins when the standby system control processor 3 detects an error in the active system control processor 2 (step 34). The standby system control processor 3 sends a notification of the identified error in the active system control processor 2 to a system component with a reset function 4 (step 36). The system component with a reset function 4 then attempts to verify the error identified by the standby system control processor 3 (step 38). The system component with a reset function 4 performs pre-determined tests on the active system control processor 2 in an attempt to verify the identified error (step 40). If the identified error is not verified by the system component with a reset function 4, the system component with the reset function asserts a reset command to the standby system control processor 3 which incorrectly identified the original error. The rationale behind resetting the standby system control processor 3 is the same as noted above. Either both the active system control processor 2 and the system component with a reset function 4 are malfunctioning, or the standby system control processor 3 incorrectly identified a malfunction in the active system control processor 2. Based on the probability of two errors occurring in the extremely small amount of time in which the verification process takes place, the standby system control processor 3 is placed in a reset activation state for having incorrectly identified a malfunction in the active system control processor 2 (step 44). If another system control processor is available, it replaces the reset standby system control processor 3.

If the system component with a reset function 4 verifies the error identified by the standby system control processor 3, the standby system control processor 3 and the system component with the reset function 4 jointly assert a reset command to the active system control processor 2 (step 46). The active system control processor 2 activation state is changed from active to reset, thereby functionally removing it from the system, and the activation state of the standby system control processor 3 is switched from standby to active making it the active control processor in the high availability computer system 1. If another system control processor is available, it replaces the activated standby system control processor 3 as the standby system control processor.

Figure 4:
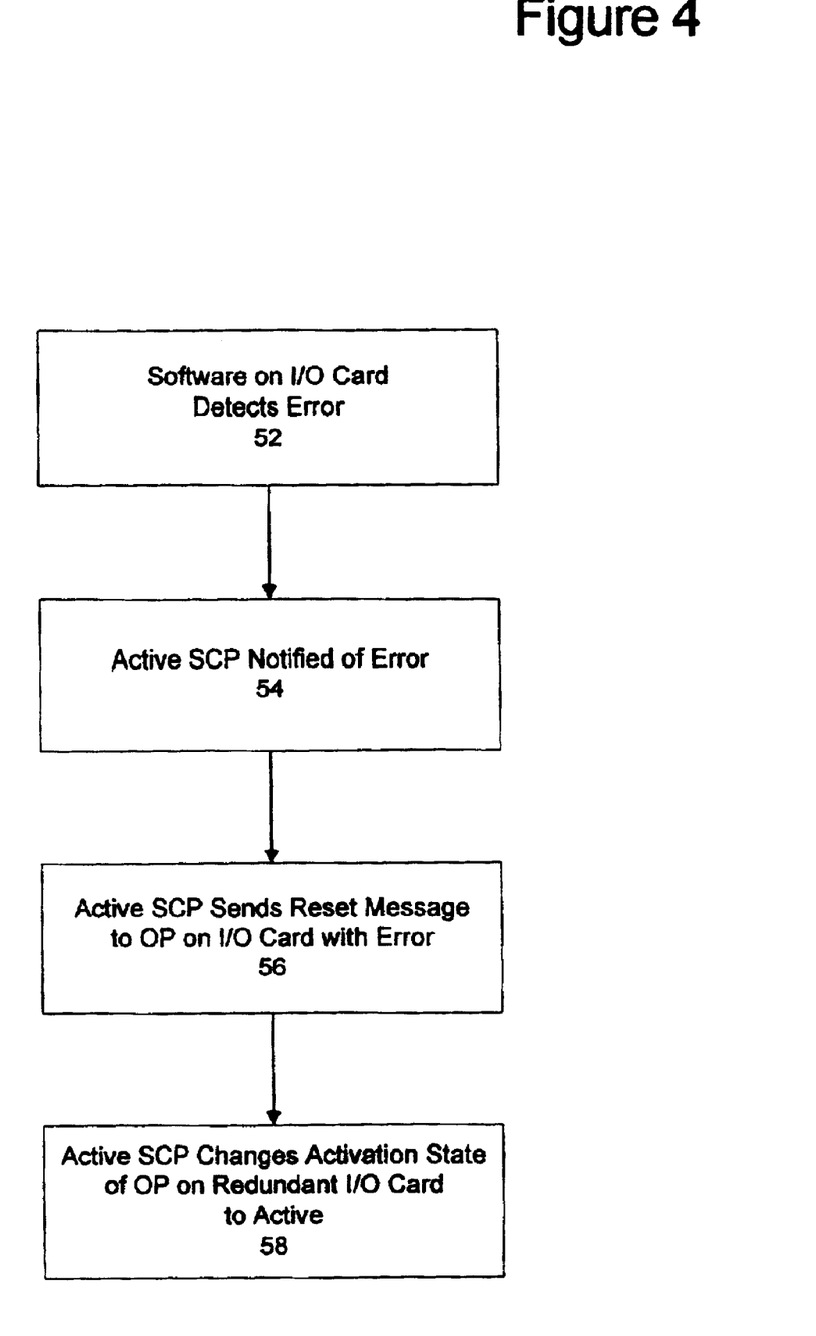
FIG. 4 is a flow chart of the sequence of steps executed by an embodiment of the present invention when a system component self-detects an error and notifies the active system control processor.

In some embodiments of the present invention, the processors and system components of the high availability computer system 1 are located on cards such as I/O cards 10. Also located on the I/O cards 10, is software 11 capable of performing maintenance checks on both the card and processor or system component located on the card. FIG. 4 depicts a sequence of events followed by an illustrated embodiment of the present invention which occurs when software located on an I/O card identifies a malfunction in either the I/O card 10 or the processor or system component located on the I/O card. The software located on the I/O card 10 periodically performs maintenance checks of the working condition of the I/O card and any processor or system component located on the I/O card. When the software on the I/O card 10 locates or detects an error (step 52), the software sends notification of the detected error to the active system control processor 2(step 54). The active system control processor 2 thereafter sends a reset message to the other processor 6, 7, 8, and 9 or system component 4, 5 on the I/O card with the malfunction (step 56). In some embodiments, the active system control processor first verifies the identified malfunction. After sending a reset message to the identified other processor or system component, the active system control processor 2 sends a message activating a redundant processor or system component to take the place of the reset processor or system component (step 58). Those skilled in the art will recognize that while the figures and descriptions herein have been discussed with reference to computer systems containing two system control processors, the method of the present invention is equally applicable to high availability systems and other systems possessing more than two system control processors and more than two system components with reset functions.

The illustrative embodiments discussed herein have used two system control processors or a system control processor in combination with a system component possessing a reset function to assert reset signals to a malfunctioning processor or component. Those skilled in the art will recognize that in alternate embodiments of the present invention a single system control processor or system component with a reset function may be used to assert a reset signal to a malfunctioning processor or system component. Likewise, other embodiments using combinations of three or more system control processors and/or system components with reset functions to assert reset signals to a malfunctioning processor or component are possible within the scope of the present invention.

It will thus be seen that the invention attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrated flowcharts are examples and not the exclusive sequence of steps possible within the scope of the present invention.

We claim:

1. In a computer system, said system including a plurality of system control processors, each said system control processor with a plurality of activation states, said system control processors controlling a plurality of other processors (OPs) in said system, each said OP with a plurality of activation states, a method, comprising the steps of:

providing a reset function for said system control processors enabling said system control processors to change the activation state of other system control processors and OPs;

setting the activation state of a system control processor to active, said active state indicating a functioning processor fully integrated into system operations;

setting the activation state of a system control processor to standby, said standby activation state indicating a functioning processor partially integrated into said system operations;

detecting an error in one of said OPs with said system cannot processor set to an active activation state;

verifying the detecting of said error in one of said OPs with said system control processor set to a standby activation state; and altering the activation stare of said OP using said system control processor set to an active activation state and said system control processor sot to a standby activation state following said verification.

2. The method of claim 1 comprising the further step of:
changing the activation state in the OP in which an error was detected from an active state to a reset state, said reset state indicating a non-functioning processor not integrated into said system operations.

3. The method of claim 2 comprising the further step of:
changing the activation state of an OPs from a standby activation state to art active activation state to take the place in said system of said OP placed into a reset activation state.

4. The method of claim 1 wherein said OPs are located on Input/Output (IO) cards interfaced with said system, said IO cards including software for reporting IO card status and OP status to said system control processor set to an active activation state and said system control processor set to a standby activation state.

5. The method of claim 4 wherein said error is detected by said software and reported to said system control processor set to an active activation state and said system control processor set to a standby activation state.

6. The method of claim 5 wherein said error is detected by polling said OPs to check status.

7. In a computer system, said system including a plurality of system control processors, each said system control processor with a plurality of activation states, said system control processors controlling a plurality of other processors (OPs) in said system, each said OP with a plurality of activation states, a method, comprising the steps of:

providing a reset function for said system control processors enabling said system control processors to change the activation state at other system control processors and OPs;

setting the activation state of a system control processor to active, said active state indicating a functioning processor fully integrated into system operations;

setting the activation state of a system control processor to standby, said standby activation state indicating a functioning processor partially integrated into said system operations;

detecting an error in one of said OPs with said system control processor set to an active activation state;

failing to detect said error in one of said OPs with said system control processor set to a standby activation state; and altering the activation state of said system control processor set to an active activation state using said system control processor set to a standby activation state.

8. The method of claim 7 comprising the further step of:
changing the activation state in said system control processor set to an active activation state to a reset state, said reset state indicating a non-functioning processor not integrated into said system operation.

9. The method of claim 8 comprising the further step of:
changing the activation state in the system control processor set to a standby activation state from a standby state to an active state.

10. In a computer system, said system including a plurality of component, said components including a system control processor with a plurality of activation states set to an active activation state, said active activation state indicating a functioning processor fully integrated into system operations, a system control processor with a plurality of activation states set to a standby activation state, said standby activation state indicating a functioning processor partially integrated into said system operations, and a system component with a reset function, said reset function enabling said system component to change the activation state of a system control processor, said system control processors controlling a plurality of other processors (OPs) in said system, a method, comprising the steps of:

detecting an error in said system control processor set to an active activation state with said system control processor set to a standby activation state;

verifying said error in said system control processor set to an active activation state with said system component with a reset function; and altering the activation state of said system control processor set to an active activation state using said system control processor set to a standby activation state and said system component with a reset function.

11. The method of claim 10 comprising the further step of:
changing the activation state in said system control processor set to an active activation state front an active state to a reset state, said reset activation state indicating a non-functioning processor nor integrated into said system operations.

12. The method of claim 11 comprising the further step of:
changing the activation state in said system control processor set to a standby activation state from a standby activation state to an active activation state.

13. The method of claim 12 comprising the further step of designating a system control processor in a standby activation state to replace the original system control processor set to a standby activation state that became the active system control processor.

14. In a computer system, said system including a plurality of components, said components including a system control processor with a plurality of activation states set to an active activation state, said active activation state indication a functioning processor fully integrated into system operations, a system control processor with a plurality of activation states set to a standby activation state, said standby activation state indicating a functioning processor partially integrated into said system operation, and a system component with a reset function, said reset function enabling said system component to change the activation state of a system control processor, said system control processors controlling a plurality of other processors (OPs) in said system, a method, comprising the steps of:

detecting an error to said system control processor set to an active activation state with said system control processor set to a standby activation state;

attemption and failing to verify said error in said system control processor set to an active activation state with said system component with a reset function; and altering the activation state of said system control processor set to a standby activation state using said system control processor set to an active activation state and said system component with a reset function.

15. The method of claim 14 comprising the further step of:

changing the activation state in said system control processor set to a standby activation state from a standby activation state to a reset activation state, said reset activation state indicating a non-functioning processor not integrated into said system operations.

16. The method of claim 15 comprising the further step of:

designating a system control processor in a standby activation state to replace the original system control processor set to a standby activation state that was changed to a reset activation state.

17. In a high availability computer system, a medium holding computer-executable steps for a method, said method comprising the steps of:

providing a plurality of system control processors, each said system control processor with a plurality of activation states, said system control processors controlling a plurality of other processors (OPs) in said system, said OPs with a plurality of activations states;

setting the activation state of a system control processor to active, said active activation state indicating a functioning processor partially integrated into said system operations;

setting the activation state of a system control processor to standby, said standby activation state indicating a functioning processor partially integrated into said system operations;

detecting an error in one of said OPs with said system control processor set to an active activation state;

failing to detect said error in one of said OPs with said system control processor with a standby activation state; and altering the activation state of said system control processor set to an active activation state using said system control processor set to a standby activation state.

18. The medium of claim 17 wherein said method changes the activation state in said system control processor set to an active activation state from an active activation state to a reset activation state, said reset activation state indicating a non-functioning processor not integrated into said said system operations.

19. The medium of claim 18 wherein said method changes the activation state of said system control processor set to a standby activation state from a standby activation state to an active activation state.

20. The medium of claim 19 wherein said method comprises the further step of:

using a system component with a reset function in conjunction with said system control processor set to a standby activation state to alter the activation state of said system control processor set to an active activation state.

21. An electronic device comprising:

a system control processor set to an active activation state, said active activation state indicating a functioning processor fully integrated into the operations of said device;

a system control processor set to a standby activation state, said standby activation state indicating a functioning processor partially integrated into the operations of said device;

a plurality of other processors (OPs) with a plurality of activation states, said OPs controlled by said system control processors, wherein an error in one of said OPs is detected by said system control processor set to an active activation state, said error is verified by said system control processor set to a standby activation state, and said system control processors change the activation state of the OP with an error to a reset activation state, said reset activation state indicating a non-functioning processor not integrated into the operations of the device.

22. In a computer system, said system including a plurality of system control processors, each said system control processor with a plurality activation states, said system control processors controlling a plurality of other processors (OPs) in said system, each said OP with a plurality of activation states, a method, comprising the steps of:

providing a reset function for said system control processors enabling said system control processors to change the activation state of other system control processors and OPs, setting the activation state of a system control processor to active, said active state indicating a functioning processor fully integrated into system operations;

setting the activation state of a system control processor to standby, said standby activation state indicating a functioning processor partially integrated into said system operations;

detecting an error in one of said OPs with said system control processor set to art active activation state;

verifying the detecting of said error in one of said OPs with said system control processor set to a standby activation state; and altering the activation state of said OP using at least one of said system control processor set to an active activation state and said system control processor set to a standby activation state following the verification of said error.

23. In a computer system, said system including a plurality of components, said components including a system control processor with a plurality of activation states set to an active activation state, said active activation state indicating a functioning processor fully integrated into system operations, a system control processor with a plurality of activation states set a standby activation state, said standby activation state indicating a functioning processor partially integrated into said system operations, and a system component with a reset function, said reset function enabling said system component to change the activation stare of a system control processor said system control processors controlling a plurality of other processors (OPs) in said system, a method, comprising the steps of:

detecting an error in said system control processor set to an activation state with said system control processor set to a standby activation state;

attempting and failing to verify said error in said system control processor set to an active activation state with said system component with a reset function; and altering the activation state of said system control processor set to a standby activation state using at least one of said system control processor set to an active activation state and said system component with a reset function.

24. A computer system comprising:

a system control processor set to an active activation state, said active activation state indicating a functioning processor fully integrated into the operation of said device;

a system component processor set to a standby activation state, said standby activation state indicating a function processor partially integrated into the operations of said device;

a plurality of other processors (OPs) with a plurality of activation states, said OPs controlled by said system control processors, wherein an error in one of said OPs is detected by said system control processor set to an active activation state said error is not verified by said system control processor set to a standby activation state, and said system control processor set to a standby activation state alters the activation state of the system control processor set to an active activation state.

25. A computer system comprising:

a system control processor set to an active activation state, said active activation state indicating a functioning processor fully integrated into the operations of said device;

a system component with a reset function, said reset function enabling said system component to change the activation state of a system control processor;

a system control processor set so a standby activation state, said standby activation state indicating a function processor partially integrated into the operations of said device, wherein an error in said system control processor set to an active activation state is detected by said system control processor set to a standby activation state, said error is not verified by said system component with a reset function, and one of said system component with a reset function and said system control processor set to an active activation state alters the activation state of the system control processor set to a standby activation state.

* * * * *